United States Patent [19]
Chaffin

[11] 3,975,968
[45] Aug. 24, 1976

[54] PRECISION LEAD SCREW ASSEMBLY AND NUT

[75] Inventor: Frank R. Chaffin, Thousand Oaks, Calif.

[73] Assignee: W. S. Shamban & Co., Los Angeles, Calif.

[22] Filed: July 22, 1974

[21] Appl. No.: 490,317

[52] U.S. Cl. ................................ 74/441; 74/89.15; 74/424.8 R
[51] Int. Cl.² ........................................ F16H 55/18
[58] Field of Search ............ 74/89.15, 424.8 R, 441

[56] References Cited
UNITED STATES PATENTS

| | | | |
|---|---|---|---|
| 3,448,632 | 6/1969 | Rumbarger | 74/424.8 R |
| 3,534,626 | 10/1970 | Elliott et al. | 74/424.8 R |
| 3,563,106 | 2/1971 | Goodman | 74/424.8 R |
| 3,698,257 | 10/1972 | Ballentine | 74/424.8 R |

Primary Examiner—Samuel Scott
Assistant Examiner—Wesley S. Ratliff, Jr.

[57] ABSTRACT

An improved precision lead screw and nut assembly, including an improved nut, includes a nondeformable screw member having a helical thread on the exterior thereof, the thread being formed by a rib having a crest, adjacent side walls, the rib defining a helical groove having a root which is located between the side wall of adjacent crests. The screw cooperates with a housing, the nut being positioned within the housing and cooperating with the screw such that relative rotation between the nut and the screw causes translational movement between the two. The nut includes a helical thread formed by a rib and adjacent side walls, the rib defining a helical groove having a root located between the side walls of the adjacent crests of the nut. The nut is preferably formed of a thermoplastic base material such as an acetal resin containing finely divided particles of a fluorocarbon resin such as polytetrafluoroethylene uniformly distributed throughout the base material.

6 Claims, 8 Drawing Figures

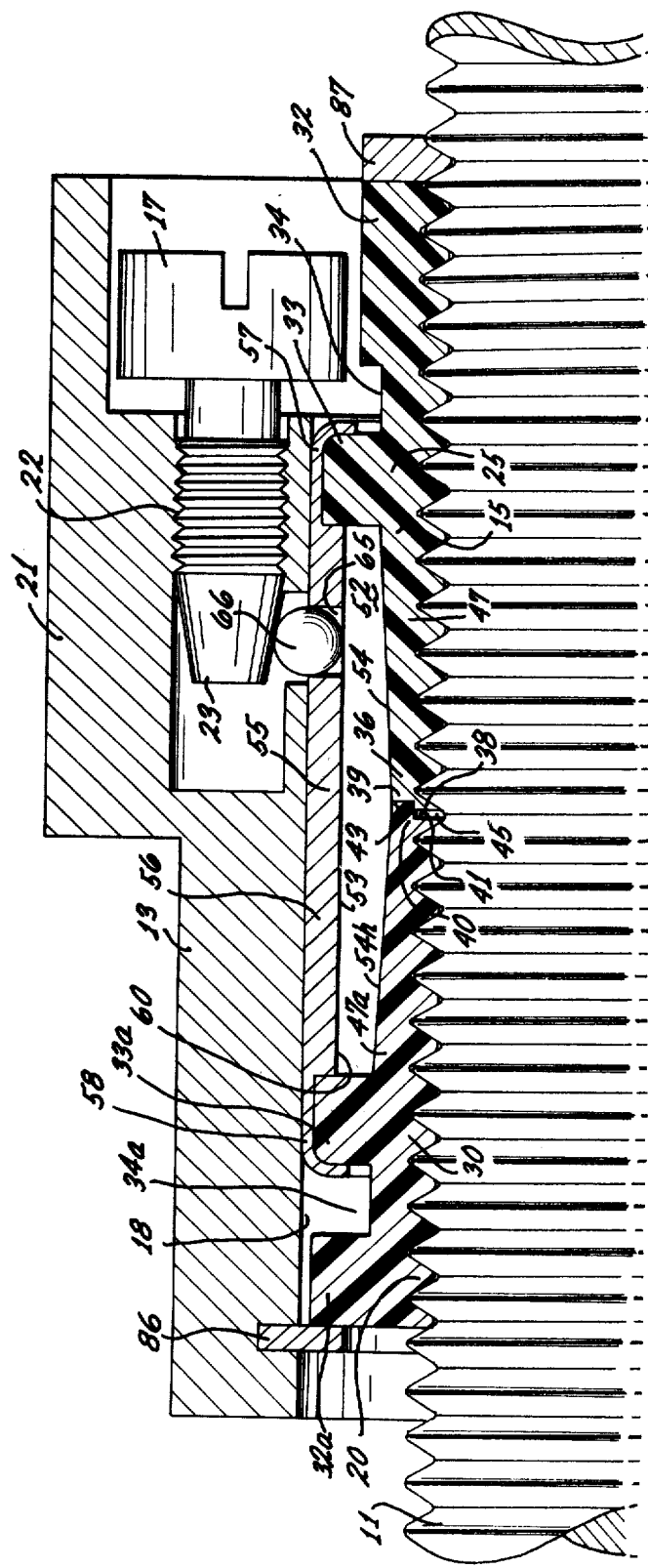

PRECISION LEAD SCREW ASSEMBLY AND NUT

BACKGROUND OF THE INVENTION

This invention relates to a nut and screw assembly and an improved nut, and more particularly to an improved precision nut and screw assembly and nut structure for use as a substitute for precision ball screw assemblies wherein the nut and screw assembly has a substantially low backlash.

Most machine tools include a table which is moveable in an x-y direction or in three coordinates, that is, an x-yz direction. The table is normally mounted on a saddle which includes a lead screw or a ball screw device to effect movement of the table in one coordinate direction. Normally, the lead screw is rotated to effect translational movement of the nut assembly which is fixed in a housing such that movement of the nut moves the housing, the latter attached to effect controlled movement of the table.

In precision machine tools, and other precision devices, the usual choice of a translating assembly is a precision ball screw assembly.

Most frequently the choice of a precision ball screw assembly is predicated on the desire for low backlash, a significant consideration, especially with numerically controlled machine tools which must be positioned automatically and accurately under the control of electronic control assemblies.

The ball screw assembly is recognized as a highly accurate translating device, and normally includes a screw and a nut, with balls in the form of ball bearings being located between the nut and screw. In the relative movement of the nut with respect to the screw, the ball bearings roll in grooves. Thus, these devices are inherently low friction devices in which the dynamic friction of the system is essentially the same as the static friction of the system. While a ball screw is a highly accurate device, it does have some disadvantages in the sense that it is a relatively expensive assembly, for example, it is not uncommon to find ball screw assemblies priced in the range of several thousand dollars each. Part of the reason for the expense in such assemblies is the fact that the manufacture thereof requires matching of the ball elements to the nut and the screw.

While most ball screw assemblies of the precision type are capable of accuracy to the order of one-tenth of one-thousandth of an inch, the overall accuracy of the machine tool may be somewhat less because of the errors in the thrust bearings and the gear train. Accordingly, a precision nut and screw assembly which is capable of accuracy to the extent of one-thousandth or one-half of one-thousandth of an inch finds utility in roughly seventy to eighty percent of the installations which are currently utilizing the more expensive precision ball screw assemblies.

Since, as mentioned above, a ball screw involves matching of the balls, the grooves of the nut and the grooves of the screw, it is not possible to replace a worn nut without going through the expensive procedure of rematching the nut, the balls, and the screw. Accordingly, the usual procedure is to replace the entire ball screw assembly, an expensive operation. Morerover, there is not much adjustment available in the friction of a precision ball screw assembly.

There have been instances in the operation of machine tools in which metallic chips have become lodged between the ball and the screw or between the ball and the nut of a ball screw assembly resulting in a catastrophic failure of the ball element as it attempts to roll over the metal chip. This failure is in the nature of a compressive failure sometimes referred to as "Brinnelling" which requires a complete replacement of the precision ball screw assembly. Moreover, if for some reason the nut is advanced off the end of the screw such that the balls fall out of their position, they cannot be replaced without precision matching and placement in the proper position within the ball screw assembly.

In the case of larger machine tools in which a relatively heavy table is moved in a vertical position under the control of a precision ball screw, it is usually necessary to lock the table in the vertical position by some physical locking device, or in the alternative, to maintain the power on the screw so as to hold the table in the vertical position. The reason for this is that a ball screw has a relatively low coefficient of friction and the weight of the table and the weight of the nut tend to cause the entire assembly to coast to its lowermost position. Additionally, because of the low coefficeint of friction, which for precision ball screw assemblies is very very low, there is a tendency for the work table to "float" even in horizontal x-y movements.

The operation of a ball screw normally involves contact between the rollers of the ball screw and one side wall of the groove on the screw in moving in one direction, and rolling contact between the balls and the other side wall in moving in the opposite direction. Thus, in some assemblies of ball screws, there are two sets of balls which alternately engage one side wall of the screw dependdding upon the direction of movement. As the balls wear, there is corresponding wear on the screw, and because of the nature of ball screws, it is not possible to adjust for the wear which takes place. In view of the fact that most machining operations are normally carried out in what is best described as the mid portion of the machine travel, the major wear on the screw occurs in that portion of the screw generally around the mid portion of the travel or several inches or feet in each direction, depending upon the size of the machine tool. Thus, the accuracy of the equipment in that portion of its movement in which most of the machining is done gradually decreases. If it is attempted to adjust the ball screw to compensate for the slack due to wear in the center portion of the travel where there has been relatively less wear. The result is that the translating motion of the table in any of the coordinate directions is nonuniform, in the context of higher frictional movement at the extreme ends of the range and considerably less friction in the mid range, depending upon the extent of wear.

Nonetheless, it is quite apparent that ball screws of the precision type generally perform well and have received wide acceptance because of the precision and relatively low friction which is characteristic of a precision ball screw.

Lead screw and nut assemblies are known in the prior art in which the nut is fabricated of a plastic material, see for example, U.S. Pat. No. 3,698.257 issued Oct. 17, 1972, and assigned to the same assignee.

U.S. Pat. No 3,190,132 of June 22, 1965, describes a tuner mechanism which includes a floating sleeve of plastic in which the threads of the plastic differs from the threads of the worm so as to prevent backlash between the worm shaft and the plastic sleeve.

U.S. Pat. No. 3,081,664 of Mar. 19, 1963, describes a close tolerance antifriction assembly in which a film coating of a plastic material is adhered to the mating surfaces of one of the threaded members.

It will be apparent, that there are definite advantages in providing a precision nut and screw assembly having a very low backlash, for example between one-thousandth of an inch and one-half of one-thousandth of an inch and in which the cost for such an assembly is substantially less than that for a comparable assembly of the ball screw type. With such a precision nut and screw assembly, there are added advantages if it is possible to replace the nut should the same become worn thereby reducing substantially the cost of maintenance and replacement, a definite factor in the use of ball screw assemblies.

In some installations, the use of a nut and screw assembly which provides substantially reduced backlash and precision, but which does not "coast" as does a ball screw assembly, is definitely advantageous, especially with respect to vertical translating mechanisms for use with machine tools having relatively heavy work tables which must be moved in a vertical direction. That is, if the nut and screw assembly provides acceptable accuracy in its translating motion, without substantial backlash, and has sufficient friction to maintain a proper vertical position without the application of a holding torque through the motor and screw, or without the necessity for positively locking the table in the vertical position, such an improved nut and screw assembly would have definite advantages.

It would also be advantageous to provide a precision nut and screw assembly in which the screw does not undergo any considerable wear and in which the rear takes place on the nut which can be easily replaced and wherein the adjustment thereof is relatively simple to provide the proper frictional and backlash characteristics as may be desired.

SUMMARY OF THE PRESENT INVENTION

By the present invention, an improved nut and screw assembly is provided, along with an improved nut member which overcomes some of the problems encountered with precision ball screw assemblies. For example, in accordance with the present invention, the relative translational movement between the nut and the screw is principally a sliding movement as opposed to a rolling movement, with the result that the assembly of the present invention is self-cleaning and most of the chips which fall on the screw are wiped out of the way before the nut rolls over that portion of the screw. Since the nut is formed of a plastic material, as will be described, should a chip become lodged between the screw and the nut, it will either become embedded in the plastic or otherwise effect the plastic rather than damage the threads of the screw. By way of comparison, where there is a catastrophic failure in a ball screw assembly due to fracture of one of the ball elements, the screw is invariably chewed up by the fragments of the ruptured element.

Another advantage of the nut and screw assembly and improved nut of the present invention is that the coefficient of static friction is higher than the dynamic friction with the result that it is possible to hold a vertical orientation contrast to the coasting characteristics of a precision ball screw.

Unlike a ball screw assembly, it is possible to replace the nut, in accordance with the present invention and to adjust the nut so as to provide the desired frictional engagement and backlash and accuracy of the nut and screw assembly. Since the structure of the present invention involves a sliding movement between a nut and a screw, each of the threads, and both sides of the threads, in each direction of movement, carry the load as contrasted with various types of precision ball screw assemblies in which only one side of the thread carries the load in one direction of movement.

In order to achieve the above-described advantages, the improved nut and screw assembly and the improved nut of the present invention provides relatively low friction, while also providing high precision and may be used as a substantially less expensive alternative to a precision ball screw.

Thus, in accordance with the present invention, an arrangement is provided by which an isostatic pressure is applied to a nut member formed of plastic material, the isostatic pressure being applied in a radial direction to effect an axial movement of the portion of the nut thread side walls which are facing the opposed side walls of the screw. Since these facing side walls are in tight sliding engagement, backlash of the assembly is substantially reduced. To this end, the nut is formed of a plastic material which includes a base plastic having uniformly distributed in the base plastic finely divided particles of a fluorocarbon resin such as polytetrafluoroethylene (PTFE). The parent plastic material may be an acetal resin in the form of an acetal polymer or copolymer with the PTFE operating to reduce the coefficient of friction of the compounded material. The PTFE particles are relatively small in size, and prior to being compounded with the acetal resin resemble a very fine dust. Procedures are well known in the art for providing PTFE particles of this fine quality, the amount of PTFE added being sufficient to effect a reduction in the coefficient of friction of the compounded plastic material.

The principal advantage of the improved nut and the improved nut and screw assembly of the present invention is that the nut may be stressed by the application of an isostatic pressure thereto to conform to the threads of the screw so as to substantially reduce the backlash between the two. As will be appreciated, the composition of the plastic material is such that it behaves to some extent as if it were a metal component, but is deformable to a slight degree and therefore, does not creep or cold flow nor does it take a permanent compressive set. Operating with a plastic material of this type, it is possible to accommodate the small variations which would result in critical fitting and machining operations if a conventional metal nut were to be used in an attempt to provide a precision lead nut assembly.

Accordingly, the controlled deformation which may be achieved in accordance with the present invention resulting from the application of an isostatic pressure to the nut is principally responsible for the precision of the nut and screw assembly as described herein.

The plastic material is preferably one of low moisture absorption such that its dimensions do not change during the use and under varying humidity conditions. Preferably, the modulus of elasticity of the compounded plastic nut material is between 200,000 and 400,000 psi, with a preferred range being between 350,000 and 380,000 psi. As will be apparent, this relatively high modulus of elasticity provides a material having considerable strength, but one which can be deformed only minutely without taking a permanent set or cold flowing to an extent which would result in an improper fit with the screw.

In accordance with the present invention, the screw is of a nondeformable material such as steel and the like and includes a generally helical thread on the exterior thereof which is formed by a rib having a root which is located between the side walls of the adjacent crests of the screw. The screw is received within a housing which also receives the nut, the latter cooperating with the screw such that relative rotation between the nut and the screw causes a relative translational movement between the screw and the nut, the latter being fixed to the housing. The nut includes a helical thread on the interior thereof formed by a rib having a crest and adjacent side walls, the rib of the nut defining a helical groove having a root located between the side walls of adjacent crests of the nut. Cooperating with the nut, which may be formed in two pieces for ease of assembly, is a pressure applying means which applies an isostatic pressure radially inwardly on the nut to bring about an isostatic compression of the nut about the lead screw, thereby causing the side walls of the ribs of the nut to come into close, intimate sliding contact with the side walls of the ribs of the screw. Between opposing roots and crests of the screw and nut combination of this invention, there is a space so that the rib of the nut may be urged radially inwardly with respect to the groove on the screw.

In order to insure a good driving relationship between the nut and the screw and to provide for engagement between the opposed facing side walls of the nut and the screw, the angle between the side wall of the crest of the screw and the major diameter of the screw is in the range of between 30° and 60°, and preferably approximately 45°.

The application of isostatic pressure to the nut is accomplished by an annular sleeve of incompressible material such as plastic or elastomer which cooperates with a pressure applying device in the form of an adjustable screw having a tapered forward end and a ball member which is contacted by the tapered forwarded end of the screw and moved radially inwardly to create an isostatic pressure in the incompressible material surrounding the nut. The material applying pressure to the nut is substantially completely confined such that an application of pressure thereto is transmitted radially inwardly, in a 360° fashion to apply the isostatic pressure urging the side walls of the nut into engagement with the side walls of the screw.

Even though highly loaded through the application of isostatic pressure, the nut does not substantially or permanently deform, but deforms sufficiently to be in close sliding engagement, and due to the fact that the plastic material forming the nut does not take a permanent set or cold flow to any extent, the application of a small radially inwardly directed force brings about the application of a substantial isostatic pressure.

As will be appreciated, an increase in the radially inwardly directed force increases the pressure which forms a tighter fit between the opposed mating parts, increasing the friction therebetween but also reducing the backlash. As will be appreciated, it is possible to apply such a high radially inwardly directed force that there is no backlash between the nut and the screw, but wherein such a force is so high as to create high frictional forces between the two elements.

By the present invention, the plastic material forming the nut is somewhat deformable, has a low coefficient of friction, and the pressure applying the means are adjustable so that varying pressures may be applied in order to substantially reduce the backlash as measured by a tolerance of between one-thousandth of an inch and one-ten thousandth of an inch while permitting rotation between the nut and the screw. To this end, the angle of the side walls of the screw are controlled to between 30° and 60° to assure positive sliding engagement between the opposed side walls of the nut and the screw while permitting sliding movement relative thereto. In other words, the selection of tapers is such that there is a sliding relationship rather than a gripping relationship. By way of example, "Morse" tapers usually in the range of less than 15° exhibit a gripping action rather than a sliding action between the opposed tapered surfaces.

The practical advantages of the lead nut and screw assembly and improved nut of the present invention, briefly described above, stem from the fact that by use of a plastic screw having controlled physical properties, it is possible to achieve a precision relationship between the nut and the screw which for many operations is fully equivalent to that achieved by a precision ball screw assembly. However, by the present invention, it is possible to repair the nut and screw assembly by installing a new nut, an operation not possible with precision ball screw assemblies which require matching of the parts. This is possible, in accordance with the present invention since any wear which takes place between the nut and the screw takes place on the nut such that the dimensions of the screw remain substantially the same throughout the useful life of the screw. Similarly, because the screw threads are engaged on each of the side walls regardless of the direction of movement, there is no coasting as is characteristic of some precision ball screw devices, an advantage especially where the assembly of the present invention is installed to controll movement in a vertical direction.

It will also be noted that in the event that the nut begins to wear, it is possible to make adjustments which do not adversely affect the operation of the nut and screw assembly in accordance with the present invention. More specifically, since the nut wears rather than the screw, the relative friction of the nut and screw assembly remains substantially constant throughout the entire length of travel since the mid portion of the screw or the portion thereof on each side of the mid portion where most of the machining operations take place does not wear in preference to the ends of the screw, as is the case with conventional lead screw assemblies or precision ball screw assemblies.

These and other advantages and features of the present invention will become more apparent with a detailed description of the preferred embodiments such as those illustrated and described in connection with the accompanying drawings.

DESCRIPTION OF THE DRAWINGS

FIG. 1 is a view in perspective of the nut and screw assembly in accordance with the present invention;

FIG. 2 is a sectional view of a portion of a screw member constructed in accordance with the present invention;

DESCRIPTION OF THE PREFERRED EMBODIMENT

Figure 3:
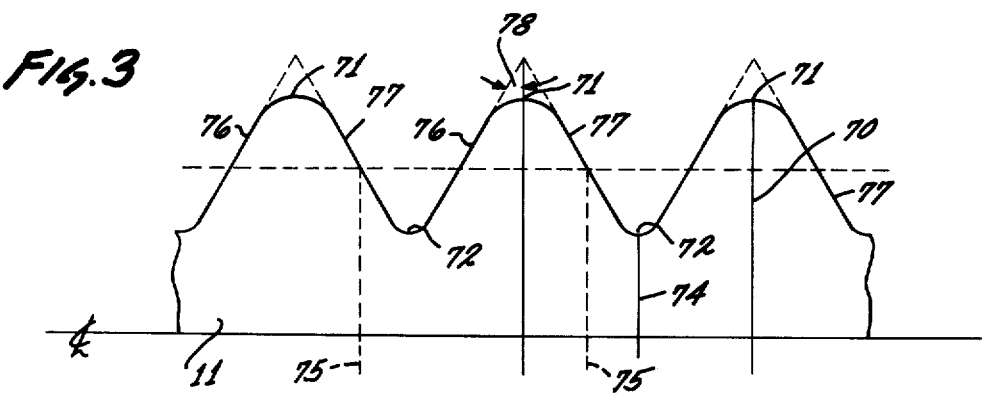
FIG. 3 is a view, partly in section and partly in elevation, of the nut in accordance with the present invention.

Referring to FIG. 1 which illustrates a preferred form of the present invention, a nut and screw assembly 10 includes a threaded screw member 11 preferably formed of a non-deformable metallic material. Cooperating with screw member 11 is a housing 13 also of metal, the housing normally being affixed to a member which is to be moved. In the form illustrated, the screw 11 is rotated to affect translational movement of the housing 13 through a nut member 15 secured within the housing.

The nut is received within the housing and cooperates with the screw member whereby relative rotation between the nut and the screw affects relative translational movement therebetween. In the form illustrated, the nut is fixed relative to the housing such that rotation of the screw affects translational movement in the directions indicated by the arrows.

The housing also includes a screw member 17 which forms part of the isostatic pressure applying system to be described in detail below.

Referring now to FIG. 2, the housing 13 includes an inner wall 18 which is spaced from the outer threaded surface 20 of the screw 11. A portion of the housing 13 is formed with a boss 21 which contains an internally threaded passage 22 which receives the externally threaded screw member 17. The forward end of the screw member 17 is tapered as indicated at 23, and the screw member 17 is movable axially into and out of the threaded opening 22.

In the form illustrated, the nut 15 is formed of two pieces 25 and 30, a two-piece nut assembly being used for ease of assembly as will be described hereinafter. One end of portion 25 of the nut includes a shoulder 32 spaced from a second shoulder 33, the latter extending radially outwardly from the center of the nut a distance greater than shoulder 32. Each of the shoulders 32 and 33 completely encircle the outer periphery of the portion 25 of the nut. Positioned between the two shoulders 32 and 33 is a groove 34 which likewise extends around the entire outer periphery of the nut member 25.

Nut member 30 is constructed generally along the lines of member 25 and includes at one end a shoulder 32a which is shorter in axial direction than shoulder 32, but extends outwardly radially a somewhat greater distance than shoulder 32. Spaced from shoulder 32a is a second shoulder 33a which is essentially the same as shoulder 33, a groove 34a being located between the shoulders 32a and 33a.

The inner end 36 of member 32 includes an inner annular shoulder 38 which forms an outer annular recessed face 39, the shoulder 38 and the recessed face 39 being formed in the end face of member 25. The facing end portion 40 of member 30 includes an inner recessed face 41 forming an outer annular shoulder 43, the parts 25 and 30 being arranged axially such that shoulder 43 is received within the face 39 while shoulder 38 is in opposed, spaced relationship to the recess 41, a space 45 being provided to assure that the cooperating shoulder 43 and recessed face 39 form a seal therebetween.

As indicated in the drawings, the portion 47 of member 25 between shoulder 33 and the end 37 thereof is tapered such that the cross-sectional dimension thereof gradually decreases. There is a corresponding taper 47a on member 30, as shown. Thus, when assembled, shoulders 33 and 33a effectively form an elongated recess 50 which extends completely around the outer periphery of the assembled nut 15. Received within this recess is a noncompressible member 52 including an outer flat face 53 and complimentary tapered faces 54 and 54a which mate with faces 47 and 47a of the nut. As indicated, the outer periphery of shoulders 33 and 33a are spaced slightly from the inner wall 18 of the housing, while the outer surface 53 of the incompressible member 52 is likewise spaced from the inner wall 18 of the housing.

Received within the annular clearance between the outer surface portions of the nut and the inner wall 18 of the housing is a retainer sleeve 55, including a central body portion 56 and end tangs 57 and 58. As illustrated, the tangs 57 and 58 cooperate with the shoulders 33 and 33a to secure the pieces 25 and 30 of the nut in a butting, sealing relationship. As illustrated the tangs are formed around the radially extending wall of each of the shoulders 33 and 33a which will form the side wall of grooves 34 and 34a, respectively.

The body portion 56 of the retainer sleeve 55, the latter preferably formed of metal, is dimensioned axially to be received within the shoulders 33 and 33a, and includes an inwardly disposed face 60 which contacts the surface 53 of the incompressible member essentially around the entire portion of the surface 53. The outer surface of the central body portion 56 of the retainer sleeve 55 includes a depression 65 formed therein, the depression being located in alignment with the general position of the tapered end 23 of the screw member 17. Located between the tapered face 23 and the depression 65 is a spherical, metallic ball 66 which is likewise contacted by the tapered forward end 23 of the screw member 17.

By moving the screw axially, the ball 66, which is held in the depression 65, is caused to bear against the retainer sleeve 55 with varying degrees of pressure which are transmitted from the retainer sleeve through its body portion 56 to the incompressible member 52. In turn, the incompressible member transmits the pressure isostatically through the outer faces 54 and 54a of the nut parts 32 and 32a. Since the noncompressible member 52 is substantially completely confined in the annular chamber formed between the inner face 60 of the body portion of the retainer sleeve and the outer surfaces 54 and 54a of the nut members 32 and 32a, an isostatic pressure, or a substantially uniform pressure in all directions is applied through that portion of the nut which overlies the screw. Since the two ends of the faces of the nut members 32 and 32a are sealed, as described, the incompressible member is effective in transmitting the pressure in an isostatic manner.

The nut members 32 and 32a, in accordance with this invention are formed of a plastic material which, in accordance with the present invention, is a thermoplastic base material such as an acetal resin containing a PTFE lubricant which is finely divided and uniformly distributed through the acetal resin. The PTFE is present in an amount sufficient to reduce the coefficient of friction of the acetal resin, but not present in an amount which creates creep or cold flow of the compounded mixture, as will be apparent from the data hereinafter set forth. While PTFE has been included in the material and operates to reduce the coefficient of friction, lubricating oils and the like may be used with the nut of the present invention. The compounded material may be injection or extrusion molded and thereafter punched, milled, stamped, drilled, ground, or machined to final dimensions, if desired. Such a material, being basically an acetal resin has outstanding creep resistance although the addition of the PTFE additive for lubricating purposes reduces it somewhat. To assure dimensional stability of the material, the parts are heat treated after formation to take out any stresses formed during molding.

The acetal resin may be a homopolymer or a copolymer and the compounded material with the PTFE offers the advantages of low moisture absorption, i.e. between 0.15 and 0.25 percent after 24 hours and between 0.5 percent and 0.8 percent at an equilibrium condition, when tested by ASTM D570. The flexural modulus as measured by ASTM D790 is relatively high, i.e. between 350,000 and 410,000 psi, the modulus of elasticity is also high and between 200,000 and 400,000 psi and preferably between 350,000 to 380,000 psi as measured by ASTM D790, the tensile strength is preferably in the range of 6,500 to 9,000 psi as measured by ASTM 638 while the shear strength, measured by ASTM D732 is between 6,500 and 8,000 psi. The coefficient of friction of the compounded material, absent in external lubricant, and measured on steel using the inclined plane method known in the art, is between 0.04 and 0.15. In order to reduce inertia, in those cases in which parts are movable, the specific gravity of the compounded material is low, e.g. in the range of 1.42 to 1.55, as measured by ASTM D792.

Since the compounded part is under load, the compression strength or the pressure at failure divided by the cross sectional of the part, should be between 1,800 and 4,500 psi at 1 percent deformation and between 11,000 and 14,500 psi at 10 percent deformation, when tested by ASTM D695. Also, it is preferred to have a relatively hard material, i.e. between M60 and M78 on the Rockwell M scale when tested by ASTM D875.

Effectively, such a compounded material, of the above properties, may be stressed and will creep or cold flow a small amount, but will not take a permanent compressive set and therefore is capable of recovery.

It is this combination of properties which offers unique advantages, especially since the wear of the compounded material of the present invention is excellent and the material wears in preference to the metal part with which it is in contact. Where accuracy of controlled movement is important, as for example in various types of machine tools in which precision of movement is required over the entire range of movement, the preferential wearing of the nut in preference to the way offers several advantages as above mentioned.

To this end, the compounded material which is of unique properties for the present invention is formed into the appropriately shaped part and is so proportioned to be received in a compressed deformable state in the sense that small dimensional variations are compensated for by stressing the part short of causing it to permanently deform or creep.

Referring to FIG. 3, the details of the screw 11, constructed in accordance with the present invention are illustrated. For purposes of reference, the major diameter of the screw is illustrated by line 70 which extends from the center axis of the screw to the crest 71 of the rib of the thread. Between adjacent crests 71 is a root designated 72, the minor diameter being defined as the diameter along the line 74 from the root to the center line of the screw. The pitch lines 75 define the pitch of the screw, the pitch being the distance between adjacent pitch lines. Adjacent to each of the crests is a leading flank side 76 and a following flank side 77, the terms leading and following being used for purposes of orientation only. The half angle of the thread is defined as the angle between the apex or origin of the angle formed between adjacent leading and trailing flank sides of each thread, the half angle being designated as 78 and formed by bisecting the angle defined by the sides.

As illustrated in the drawings, the crests of each of the ribs has been rounded, and the half angles of the thread are selected so as to be in the range of between 30° and 60°. With angles less than 30°, that is if the flank sides more closely approach a vertical position, radially inward movement of the nut creates substantial side pressures and substantially increases the friction between the flank side of the nut threads and the flank side of the screw threads. Where the angle is 15° or less, the range of Morse tapers is reached wherein a gripping rather than sliding action is achieved. Above approximately 60°, the effectiveness of the nut and screw as a driving mechanism is substantially reduced since the screw tends to slip axially through the threads of the nut rather than to drive the same. In accordance with the present invention, therefore, it is desired to maintain the half angle of the threads between 30° and 60°, and preferably at about 45° in order to provide for some adjustment of the nut radially inwardly by the application of an isostatic pressure thereto while at the same time maintaining a driving relationship which is necessary to effect translational movement.

By way of example, the screw may have a major diameter of 0.975 inches and a minor diameter of 0.825 inches, with a quarter inch pitch and 4 turns per inch.

Figure 4:
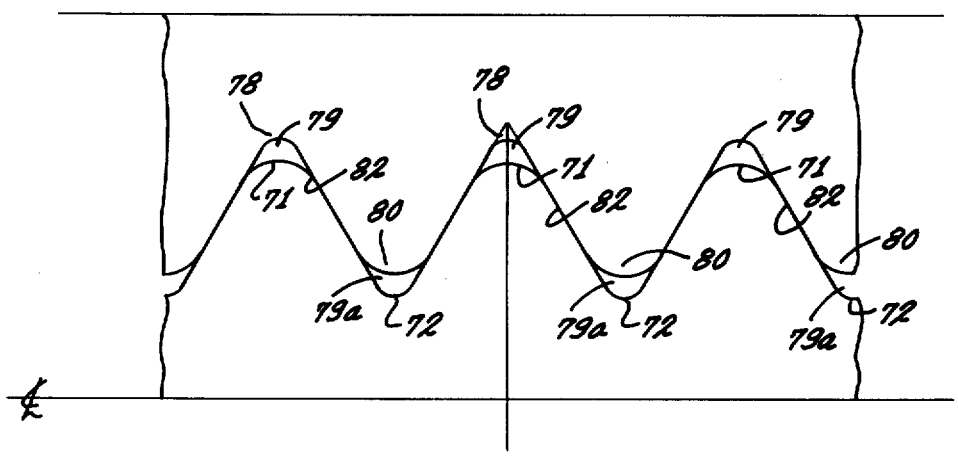
FIG. 4 is a view, in section, of the nut and screw in accordance with the present invention, for purposes of illustrating the relative operation of the two elements.

Referring now to FIG. 4, it can be seen that between the crests 71 of the nut and the opposed roots 78 of the nut, there is a space 79, while between the roots 72 of the screw and the crests 80 of the nut there is a clearance 79a, clearances 79 and 79a in fact being helical clearances following the helical paths of the thread helix. By providing such clearances, it is possible by the application of isostatic pressure to urge the crests of the nut radially inwardly towards the roots 72 of the screw whereby the flanks 82 of the crests of the nut are brought into sliding, conforming engagement with the opposed flanks 76 and 77 of the screw. By forming the nut of the plastic material herein described, there is some slight deformation of the nut, but without taking a permanent compressive set, the deformation being operative to bring about a conformational sliding engagement between the opposed flank surfaces which assist in a substantial manner in reducing the backlash between the nut and the screw depending upon the radially inwardly directed pressure achieved through the application of isostatic pressure. By forming the half angle of the screw thread between 30° and 60°, it is possible to achieve a proper balance between coefficient of friction and backlash by manipulation of the adjusting screw 17 which in turn functions to apply pressure radially inwardly to the nut. Since the pressure is isostatic, each of the crests of the nut has pressure applied thereto and is thus able to engage the opposed faces or flanks of the screw element.

Figure 5:
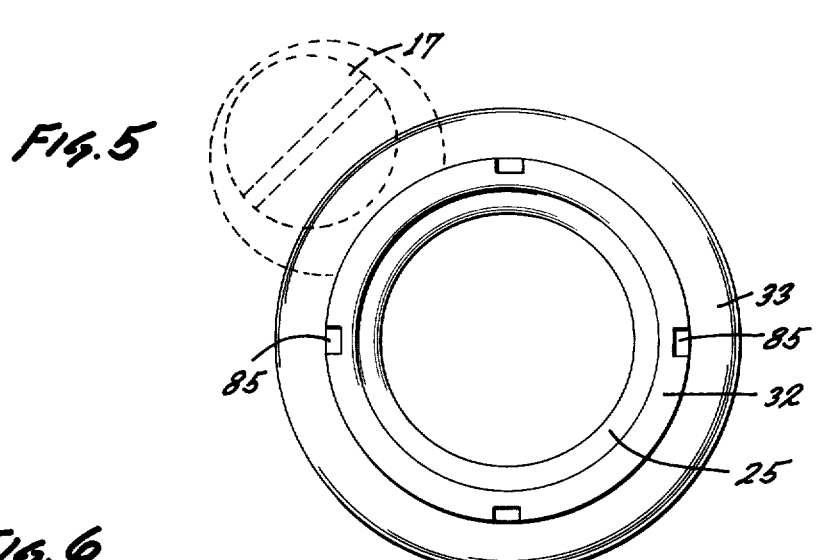
FIG. 5 is an end view of a modified form of nut in accordance with the present invention.

The nut elements are maintained in a non-rotational orientation within the housing by keyways, as illustrated in FIG. 5 in which four keyways 85 are illustrated, each of the portions 32 and 32a of the nut including keyways. Since shoulder 32 is longer axially than shoulder 32a, the keyways formed in shoulder 32 are longer than those formed in 32a. The adjusting screw 17 is shown in phantom in FIG. 5, while FIG. 1 shows the keyways in the housing 13, keys being used to lock the nut against rotation to the housing.

As illustrated in FIG. 2, the nut members 25 and 30 are maintained in proper axial position within the housing by a snap ring 86 received within the housing and bearing against the end face of member 30, the end face of member 25 being secured in place by a retainer 87.

Figure 6:
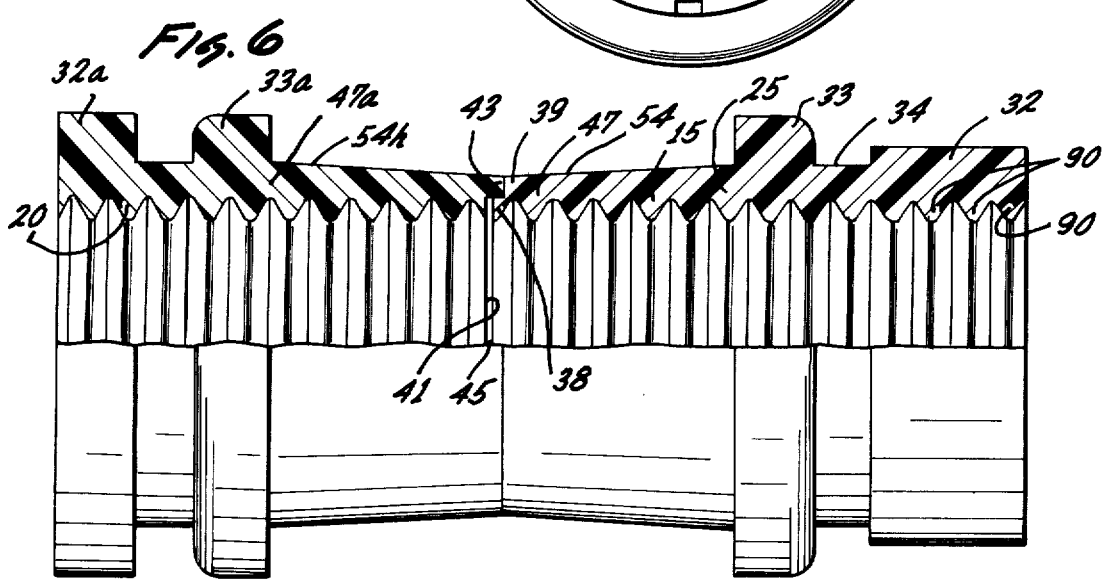
FIG. 6 is a view taken along the line 6—6 of FIG. 5, and partly in section and partly in elevation.

Referring to FIG. 6, a modified form of nut is illustrated, the nut being basically of the same configuration described in connection with FIG. 2, except that the crests of the nut are provided with a radially outwardly extending cut 90 which operates to provide a small channel at the crest of each nut. By the use of this helix formed channel disposed at the crest of each rib forming the helical thread of the nut, it is possible to provide for a greater adjustment than can be achieved with the form of nut described in connection with FIG. 2.

Figure 7:
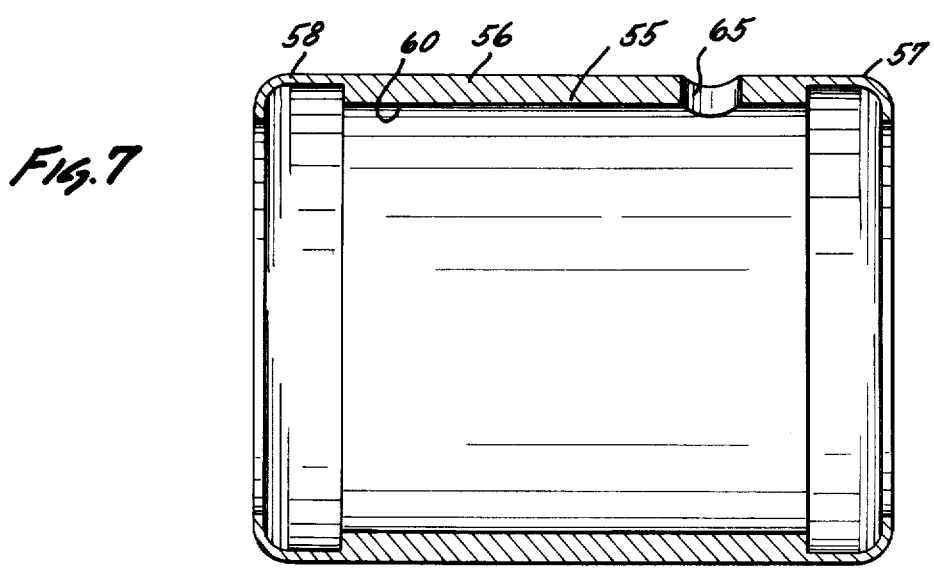
FIG. 7 is a sectional view of a retainer member in accordance with the present invention.

FIG. 7 illustrates a modified form of retainer in which the aperture 65 extends completely through the body member 56 such that the ball element 66 bears directly against the incompressible material.

Figure 8:
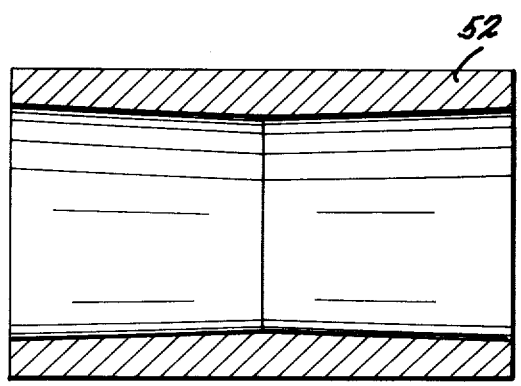
FIG. 8 is a sectional view of the incompressible member used in cooperation with the nut member in accordance with the present invention.

As illustrated in FIG. 8, the incompressible material 52 includes a generally cylindrical outer surface, as described, while the inner faces thereof are tapered to match the outer tapered configuration of faces 54 and 54a of the nut.

Assuming a lead screw major minor diameter as described above, by way of example, a nut may be used having a major diameter of 0.985 inches and a minor diameter of 0.835 inches.

The assembly of the lead screw and nut of the present invention is relatively simple, involving assembling the incompresseble material over one half of the nut assembly 25–30, assembling the second half of the nut assembly thereto, installation of the retainer and deformation of the tangs around the shoulder. With the adjusting screw 17 withdrawn from the housing, the nut is positioned within the housing, abutted against the retainer 86 and rotated such that their is proper engagement by the respective keyways and key assemblies. Thereafter, the adjusting screw 17 is inserted into the housing and the retainer 87 installed in place. Thereafter, the proper pressure is applied isostatically to the nut by manipulation of the adjusting screw 17 to increase the isostatic pressure applied to the nut. As will be appreciated, ultimately a point will be reached where the nut is so worn, in preference to the screw, that it is necessary to replace the nut assembly. This is easily accomplished by essentially the reverse of the procedure already described for assembly. That is, the retainer 87 is removed, the keyway locks are withdrawn and the nut assembly withdrawn from the housing replaced with a new nut assembly. Any nut assembly of the proper dimensions may be utilized, and it is not necessary to match the nuts with the screws as has been done with bronze or brass nuts heretofore used with lead screw assemblies or to match the balls with the nut and screw as is necessary with precision ball screw assemblies.

Accordingly, it becomes apparent that there are substantial practical advantages in the use of a lead screw and nut assembly, and improved nut as herein described. It will also be apparent to those skilled in the art that other mechanisms may be utilized to apply isostatic pressure to the nut, for example, the use of an incompressible liquid or other material other than elastomer or plastic.

Other modifications which may be made include the use of a double helix thread, or the use of a nut of a single piece where assembly and replacement are not major considerations. Tapered faces, which are used principally for self centering and pressure transmitting purposes may be made non-tapered.

From the above description of the preferred forms of the present invention, it will be apparent to those skilled in the art that various changes and modifications may be made thereto without departing from the spirit and scope of the present invention as set forth in the apended claims.

I claim:
1. An assembly comprising:
a nondeformable screw member having a generally helical thread on the exterior thereof formed by a rib having a crest and adjacent sidewalls, said rib defining a helical groove having a root located between the side walls of adjacent crests;
a housing cooperating with said screw;
nut means received within said housing and cooperating with said screw member whereby relative rotation between said nut and screw causes relative translation therebetween;
said nut means including a helical thread on the interior thereof formed by a rib having a crest and adjacent side walls, said rib defining a helical groove having a root located between the side walls of adjacent crests;
said nut means being a two piece nut member formed entirely of plastic material deformable relative to said screw, each piece of said nut including a butting end portion forming a seal therebetween, wherein the outer surface of said nut includes spaced shoulder means defining therebetween a slot;
an incompressible material located within and filling said slot;
a metal retainer means cooperating with said two piece nut member to maintain the same in sealing relation;
an adjustable means to apply pressure to said nut isostatically to urge the side walls of the helical thread of said nut into sliding pressure frictional engagement with the opposing side walls of said screw whereby backlash between said nut and screw is substantially reduced;
said means to apply an isostatic pressure including means forming an incompressible member sur- rounding at least a portion of the center surface of said nut and being supported on said housing;

means substantially completely confining said incompressible member whereby pressure on said incompressible member is transmitted to said nut isostatically;

means to vary the pressure on said incompressible member, consisting of an adjustable pressure applying means operative to effect radially inward movement of the crests of said nut towards the roots of said screw whereby the backlash may be varied between said nut and screw;

said adjustable pressure applying means including a threaded member received in said housing and having a tapered forward portion; and means cooperating with said threaded member to apply pressure to one of said retainer and incompressible material in accordance with the position of said threaded member in said housing; said roots and crests of said screw being proportioned with respect to the crests and roots of said nut whereby a space is provided between the facing crests and roots.

2. An assembly as set forth in claim 1 wherein said cooperating means cooperating with said threaded member includes a spherical element in contact with said metal retainer whereby pressure is applied to said incompressible material through said metal retainer.

3. An assembly as set forth in claim 1 wherein said cooperating means cooperating with said threaded member is a spherical element in contact with said incompressible material for applying pressure directly thereto.

4. A nut as set forth in claim 1 wherein the portion of said nut members between said shoulders is tapered.

5. A nut as set forth in claim 4 wherein the cross section of said taper is smallest at the butting end of each of said nut members.

6. An assembly comprising:
  a nondeformable screw member having a generally helical thread on the exterior thereof formed by a rib having a crest and adjacent sidewalls, said rib defining a helical groove having a root located between the side walls of adjacent crests;
  a housing cooperating with said screw;
  nut means received within said housing and cooperating with said screw member whereby relative rotation between said nut and screw causes relative translation therebetween;
  said nut means including a helical thread on the interior thereof formed by a rib having a crest and adjacent side walls, said rib defining a helical groove having a root located tween the side walls of adjacent crests;
  said nut means being formed entirely of plastic material deformable relative to said screw;
  an adjustable means to apply pressure to said nut including a threaded member received in said housing and having a tapered forward position; and
  means cooperating with said tapered forward portion of said threaded member to apply pressure to said nut, in accordance with the position of said threaded member in said housing, to urge the side walls of the helical thread of said nut into sliding pressure frictional engagement with the opposing side walls of said screw; said roots and crests of said screw being proportioned with respect to the crests and roots of said nut whereby a space is provided between the facing crests and roots.

* * * * *